United States Patent [19] | [11] 3,994,326
Sarten | [45] Nov. 30, 1976

[54] GROOVING MACHINE

[76] Inventor: Chester A. Sarten, 3823 N. 38th Ave., Phoenix, Ariz. 85019

[22] Filed: Aug. 19, 1975

[21] Appl. No.: 605,930

[52] U.S. Cl. .............................. 144/136 R; 83/416; 83/425.2; 83/437; 144/2 R; 144/242 K; 144/245 R; 144/323; 269/71

[51] Int. Cl.² ....................... B27C 5/06; B23Q 1/04; B26D 7/06

[58] Field of Search ................ 144/2 R, 114 R, 129, 144/133 R, 133 A, 136 R, 245 R, 323, 242 R, 242 K, 321; 269/71, 73; 83/402, 416, 425, 425.2, 437

[56] References Cited

UNITED STATES PATENTS

| | | | |
|---|---|---|---|
| 2,870,806 | 1/1959 | Thompson | 144/136 R |
| 2,968,326 | 1/1961 | Myers | 144/136 R |
| 3,107,908 | 10/1963 | West | 269/71 |
| 3,362,294 | 1/1968 | Oxel | 144/136 X |
| 3,470,924 | 10/1969 | Short | 144/136 R X |

FOREIGN PATENTS OR APPLICATIONS

| | | | |
|---|---|---|---|
| 1,154,787 | 4/1958 | France | 144/136 |

*Primary Examiner*—Donald R. Schran
*Assistant Examiner*—W. D. Bray

[57] ABSTRACT

The disclosure relates to a grooving machine and more particularly for making grooves in wooden or other similar members so as to provide for the fitting of partitions in the manufacturing of boxes, or the grooves may be used for supporting shelves or any other suitable structure as desired. The grooving machine having a novel tilting cable adapted to tiltably adjust the peripheries of rotary cutters rotatably mounted on an axis generally fixed relative to the frame of the machine and wherein fluid actuated cylinders clamp work being grooved onto a movable carriage which is operated by another fluid actuated cylinder mounted on the pivoted carriage support of the frame and wherein limit stop members are operable to limit actuation of the fluid actuating means to move the carriage backward and forward certain distances relative to the rotary cutters aforementioned.

12 Claims, 4 Drawing Figures

GROOVING MACHINE

BACKGROUND OF THE INVENTION

Various grooving machines or the prior art have been devoted to cutting grooves in wooden or other equivalent members and have been used for various purposes such as making boxes, furniture, shelves and other similar items. Many of these machines are quite complex and costly and also relatively difficult to adjust and operate. Other machines of the prior art somewhat simple but do not afford all of the facilities necessary to the operation of a grooving machine for production work and especially that related to the manufacture of partitioned boxes.

SUMMARY OF THE INVENTION

The present invention relates to a grooving machine particularly adapted for cutting a plurality of parallel grooves in wood or other equivalent material such that the grooved parts may be used in the manufacture of partitioned boxes or the like. The machine employs a frame having a carriage support pivotally mounted thereon; the pivotal mounting being in effect hinge, structure which allows the carriage support to be pivoted upward and downward at one end thereof and held in certain adjusted position relative to a plurality of rotary cutters carried by a power driven shaft which is generally disposed axially of the hinge axis of the carriage support. The carriage support mounts rectalinear track means on which the carriage is slidably mounted in directions at substantially right angles to the axis of the cutter shaft and the carriage is provided with a pressure fluid operated cylinder means and clamp means for quickly and positively clamping wooden members onto the carriage and for quickly releasing them so that pieces of work may be very rapidly loaded and unloaded from the carriage preliminary to and after the movement of the carriage into position for cutting grooves in the work by means of the aforementioned rotary cutters. The carriage is moved back and forth relative to the carriage support by means of a pressure fluid operated cylinder and limit switch means on the frame of the machine is actuated by traverse of the carriage on the carriage support so as to provide for limit controls of the actuating cylinder mounted on the carriage and moving the carriage backward and forward. This cylinder being a double acting cylinder capable of extending or retracting its plunger so as to move the carriage of the machine relative to the carriage support in forward and backward directions so as to carry work held thereon and to pass it relative to the rotary cutters so as to cut grooves in the work and to retract the work out of the area of the cutters in order that it may be removed from the machine and replaced by a new piece ready for the subsequent grooving operation. The machine is provided with a control panel having various controls such as pressure regulator controls, pressure gauges and switches for the forward movement and return movement of the carriage. The panel is also provided with a switch for starting the motor which runs the cutters and a control for operating the work holding clamp mechanism; further, the panel is provided with a switch for emergency reverse movement of the carriage. The controls also include a forward, reverse and stop motor control for controlling the motor which operates the cutters and the machine being thus adapted for high production grooving of wooden or other members for the production of boxes, shelves, furniture or other items in which grooves are to be cut for receiving the ends of complimental members.

Accordingly, it is an object of the present invention to provide a novel grooving machine particularly adapted to high production of grooved parts for partition boxes, shelf supports, furniture or other similar items.

Another object of the invention is to provide a grooving machine which is relatively simple in construction and operation relative to its function.

Another object of the invention is to provide a grooving machine having a novel carriage provided with a fluid operated clamping means which is very rapidly energized to clamp a piece of wood to the carriage and very rapidly deenergized to remove the piece of wood from the carriage.

Another object of the invention is to provide a novel combination of a tilted carriage support on which an actuating cylinder is mounted to move the carriage on tracks carried by the support so as to provide a unitary combination of elements which is very simple for the purpose of not only moving wooden members relative to rotary cutters but also for adjusting the entire carriage assembly and the work in a direction radially in relation to the rotary cutters in order to provide for the desired finished depth of grooves cut in the piece of wood or other member by the rotary cutters.

Another object of the invention is to provide a grooving machine particularly adapted for use in producing parts for partition boxes or the like and which is provided with various controls for operating fluid actuated cylinders for moving the carriage and for clamping parts thereon. The controls being capable of adjusting fluid actuating pressure and consequently the rate of operation of the cylinders as well as the various movements thereof and further the machine is provided with conveniently operable controls for the cutter motor as well as forward and reverse movements of the carriage as well as forward and reverse operation of the cutters.

Another object of the invention is to provide a means by which the spaced apart limit switches precisely control reciprocal movement of a carriage on a carriage support to certain positions for the insurance of the package of a wooden member relative to the cutters and for the return of the carriage to a certain position thereby saving actuating movement of the carriage by means of adjustments which relate to the size of a certain piece of material to be grooved.

Further objects and advantages of the invention may be apparent from the following specification, appended claims and accompanying drawings.

DESCRIPTION OF THE PREFERRED EMBODIMENTS

Figure 1:
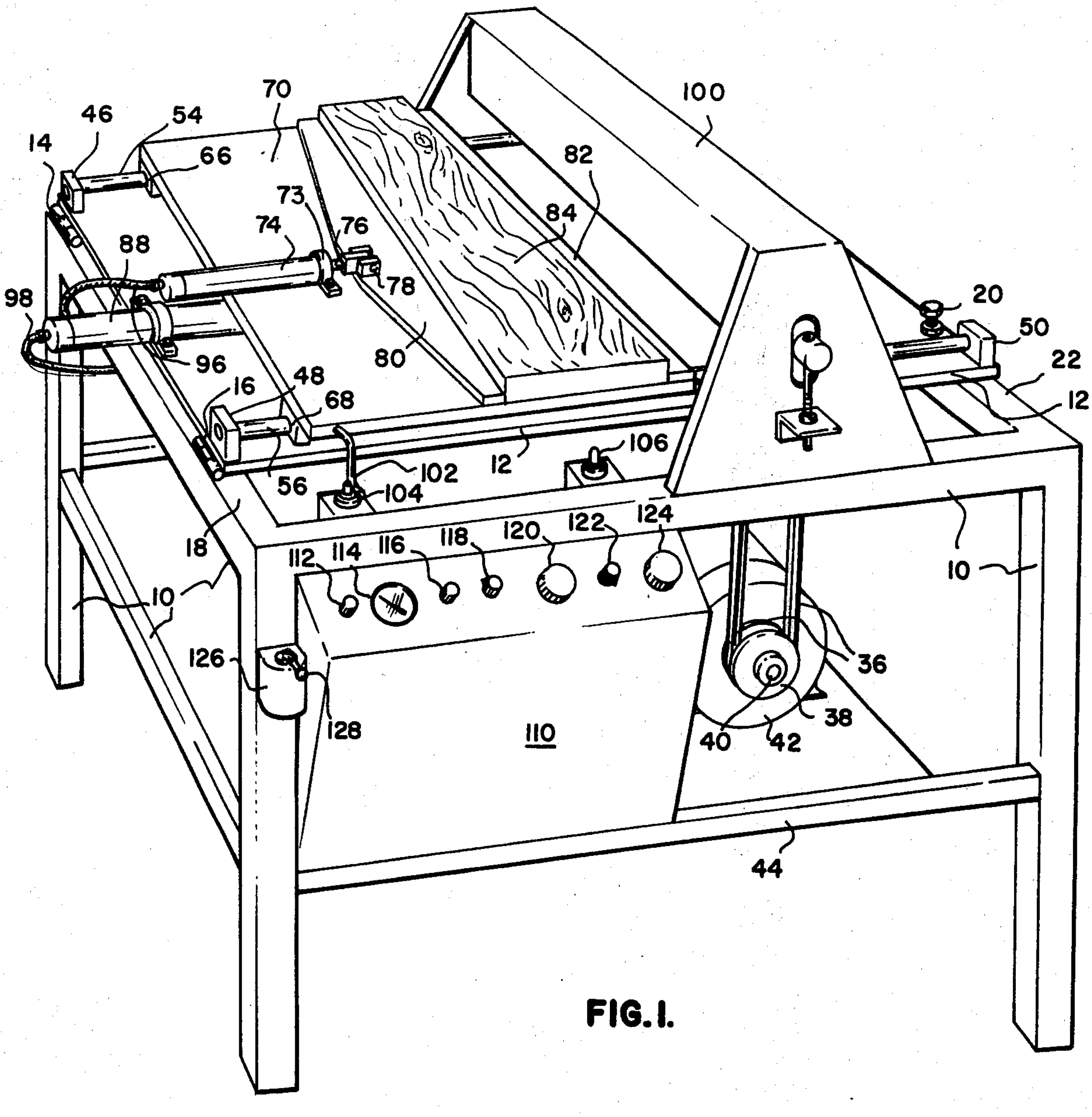
FIG. 1 is a perspective view of a grooving machine in accordance with the present invention.

The grooving machine of the present invention is provided with a frame 10 having a carriage support 12 pivotally mounted thereon by means of hinge structures 14 and 16 generally on a common horizontal axis. These hinge structure 14 and 16 are fixed to an upper horizontal member 18 of the frame 10 and the carriage support 12 is generally a rectangular plate like member having adjustable supports 20 bearing upon a horizontal member 22 at an opposite side of the frame 10. The adjustment members 20 being shown in FIG. 4 of the drawings. These members are screwthreadably adjustable in nuts 24 and in the support 12 so as to elevate or lower the carriage support plate 12 relative to an upper surface 26 of the frame member 22 all as shown in FIG. 4 of the drawings. When the carriage support plate 12 is lowered or raised the opposite edge thereof pivots about the axis of the hinge structures 14 and 16 and as will be hereinafter described such adjustment provides for elevational adjustment of a wooden member to be grooved by rotary cutters 26 carried on a rotary shaft 28 shown in best in FIG. 2 and 3 of the drawings. The shaft 28 as shown in FIG. 4 of the drawings is mounted in bearings 30 carried by upstanding portions 32 of the frame 10 and mounted on the shaft 28 is a pulley 34 engaged by a belt 36 which also engages a pulley 38 on the output shaft 40 of a motor 42. This motor 42 is mounted on a horizontal portion 44 of the frame 10. Thus, the shaft 28 and cutters 26 may be rotated to cut grooves in wooden or other members as will be hereinafter described.

Figure 2:
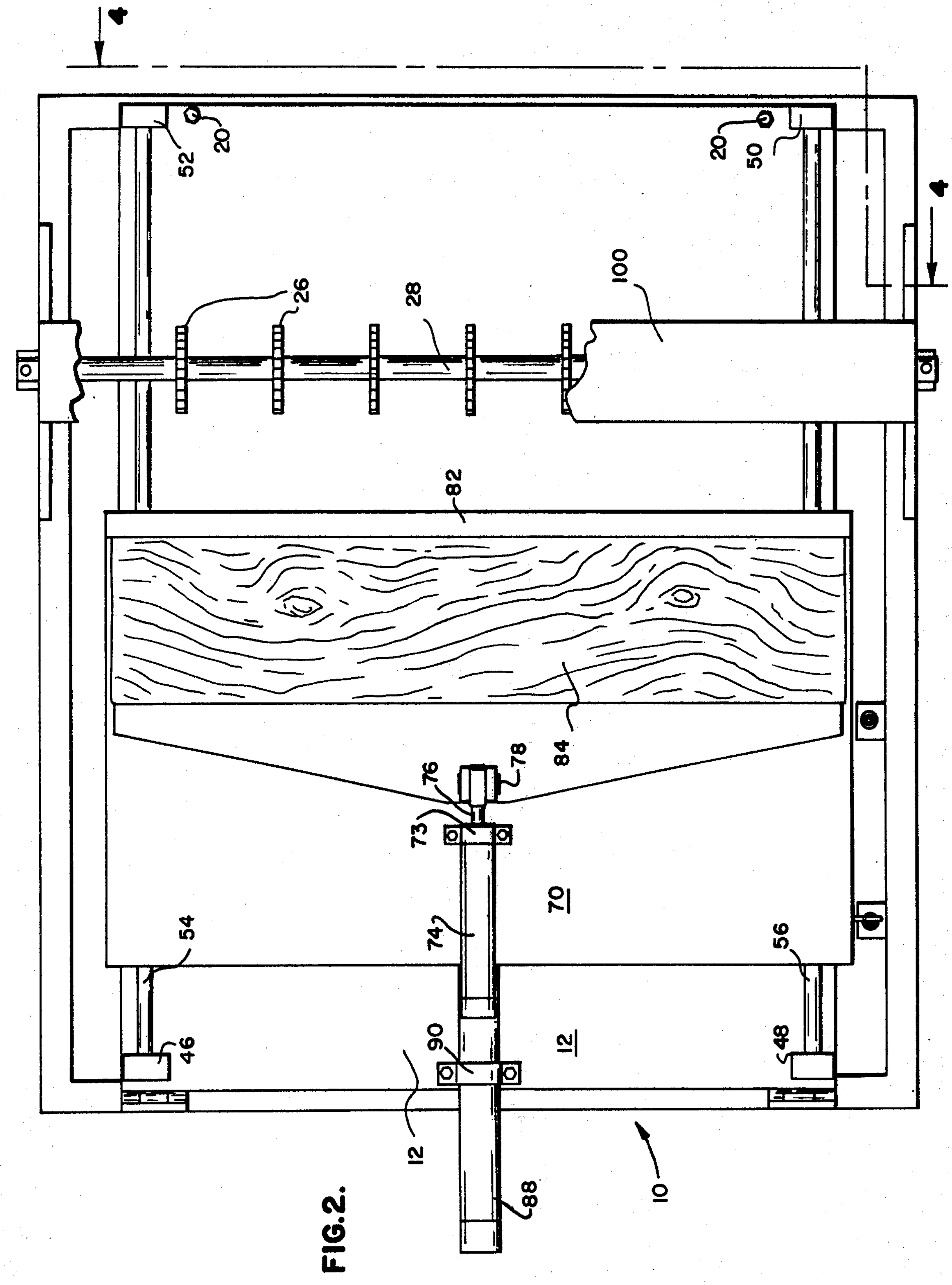
FIG. 2 is an enlarged top or plan view of the grooving machine shown in FIG. 1.

Fixed on the carriage support 12 by means of fixtures 46, 48, 50 and 52 are guide and track members 54 and 56, it being noted that the track member 54 is fixed on the carriage support 12 by means of the fixtures 46 and 52 while the guide and track means 56 is fixed to the carriage support 12 by means of the fixtures 48 and 50, all as shown best in FIG. 1 and 2 of the drawings.

Figure 3:
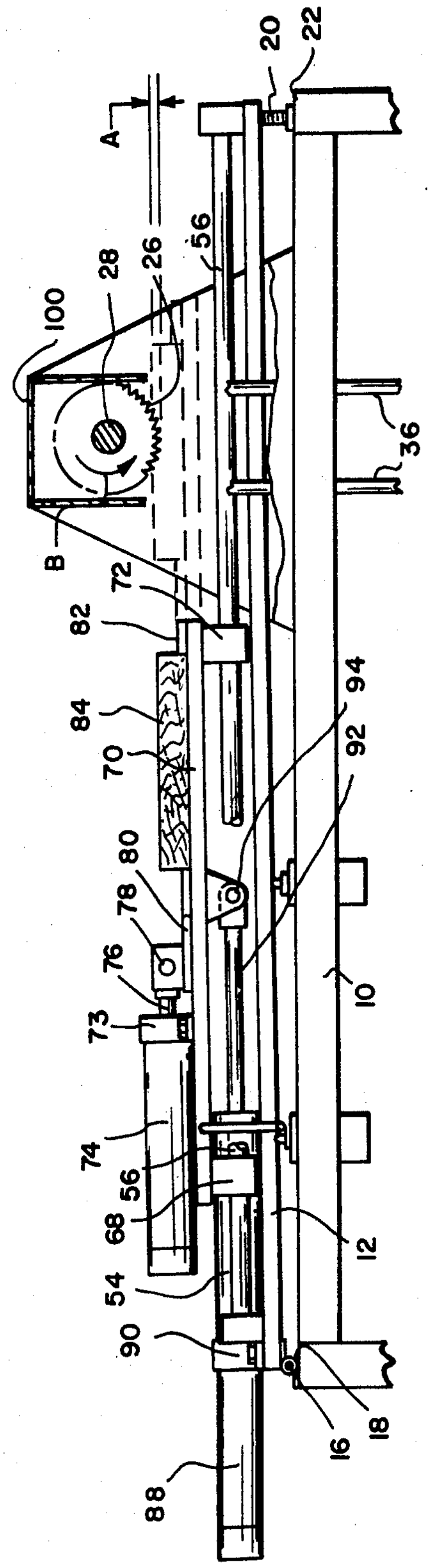
FIG. 3 is a fragmentary side elevational view of the grooving machine showing portions thereof broken away and in section to amplify the illustration.
Figure 4:
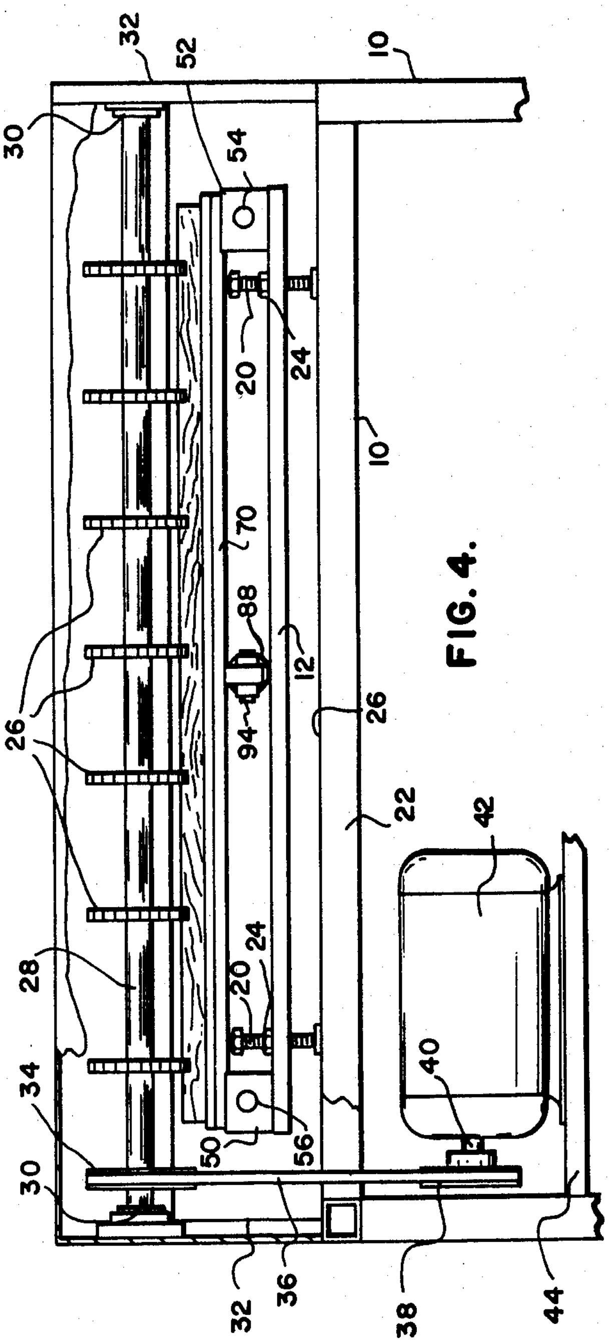
FIG. 4 is a fragmentary sectional view taken from the line 4—4 of FIG. 2 showing parts and portions of the machine broken away to amplify the illustration.

The track members 54 and 56 are traversed by bearings 66 and 68 on one end of a carriage 70 and like bearings 72 traverse the tracks 54 and 56 at the opposite end of the carriage 70, all as shown best in FIG. 1 and 3 of the drawings. These bearings 66, 68 and 72 are provided with openings therein which slidably fit over the generally circular in cross section guide and track members 54 and 56, all as shown in FIG. 3 and 4 of the drawings.

Mounted on the carriage 70 by means of a suitable clamping mechanism 73 is a fluid operated cylinder 74 having an extendable and retractable plunger 76; the cylinder 74 being a double action cyliner and the plunger 76 being connected by means of a pivot pin 78 to a clamp plate 80 which is reciprocably mounted on the upper surface of the carriage 70. A clamp bar 82 is fixed on the upper surface of the carriage 70 and a piece of wood or other work designated 84 is adapted to be clamped between the clamp bar 82 and the clamp plate 80 when the plunger 76 of the cylinder 74 is extended and thus, the clamping mechanism as shown best in FIG. 2 and 3 of the drawings on the carriage 70 holds a piece of wood or other similar material to be cut by the rotary cutters 26 on the shaft 28 when the carriage 70 is propelled back and forth relative thereto.

A carriage actuating cylinder 88 is mounted by means of a suitable mount 90 on the carriage support plate 12 and this cylinder 88 is provided with a double acting plunger 92 pivotally coupled by means of a pin 94 to a lower side of the carriage 70 so that extension and retraction of the plunger 92 will move the work together with the carriage 70 toward and away from the rotary cutters 26.

As shown in FIG. 1 of the drawings, a flexible pressure fluid conduit 96 is coupled to the clamp cylinder 74 and another flexible conduit 98 is coupled to the carriage actuating cylinder 88. Comparable conduits at opposite ends of the cylinders are provided for providing the double action function of the respective plungers and such is known to persons well skilled in fluid actuating cylinders.

Attention is directed to broken lines designated A in FIG. 3 of the drawings. These broken lines indicate the depth to which the cutters 26 cut grooves in the wooden member 84 and this depth of cut is adjustable as hereinbefore described by means of the adjustable screws 20 which elevate or lower the carriage support 12 relative to the frame and relative to the axis of the shaft 28.

A suitable cover 100 is disposed over the cutters 26 in order to provide the usual safety of operators or persons adjacent to the machine.

Mounted on the carriage 70 is a switch trip arm 102 which engages limit switches 104 and 106 which control the retracted and the forward positions of the carriage 70 automatically by controlling the operation of the double acting cylinder 88, hereinbefore described. Thus, these switches 104 and 106 may be adjusted so as to limit the travel of the carriage 70 relative to the cutters 26 in order to completely pass the work 84 beyond the axis of the shaft 28 and to return the carriage to a proper starting position at which it may be reloaded simply by manually actuating the cylinder 74 and releasing the clamp bar 80 relative to the bar 82, hereinbefore described.

A control panel 110 is mounted on the side of the machine and is provided with a manually adjustable knob 112 which adjusts a pressure regulator to control fluid pressure delivered to the cylinders 74 and 88 and the gauge 114 on the panel indicates the regulated pressure.

A control button 116 is adapted to energize the cylinder 88 to extend the plunger 92 thereof toward the cutters 26 for passing the work 84 under the cutters and causing the grooving operation to be performed. A control knob 118 is operated for energizing the cylinder 88 in the opposite direction to retract the plunger 92 and the carriage 70; and in each instance with the operation initially of the controls 116 and 118, the extention of the plunger 92 of the cylinder 88 is limited by the switch 106 and the retraction of the plunger 92 of the cylinder 88 is limited by the switch 104. Both switches 104 and 106 are contacted by the arm 102 mounted on the carriage 70, as hereinbefore described.

A cycle starting control 120 is provided for starting a cycle of operation of the machine which automatically actuates the cylinders 74 and 88 in sequence after a piece of material 84 has been placed in position as shown in FIG. 1 of the drawings, so that the cycle starter 120 may be operated to cause an entire cycle of operation automatically as hereinbefore described. A control member 122 may be used to adjust the clamp pressure of the clamp member 80 and the respective pressure directed into the cylinder 74. A control member 124 on the panel 110 is operable manually as an emergency carriage return control to return the carriage to the position shown in FIG. 1 of the drawings in the event of any emergency which may occur preliminary to the passage of the work into the area of the rotary cutters 26.

A cutter motor control 126 is provided with a control knob 128 having three positions; one of which provides for a forward movement of the cutters in the direction of an arrow B in FIG. 3 of the drawings; another of which provides for the reverse operation of the cutters and a neutral position of the arm 128 provides for a stop or deenergized position of the switch in which case the motor 42 is deenergized and does not rotate the shaft 28 and cutters 26.

It will be obvious to those skilled the art that various modifications may be resorted to without departing from the spirit of the present invention.

I claim:

1. In a grooving machine a frame; a carriage support; pivot means having a substantially horizontal axis and pivotally connecting said carriage support to said frame; substantially horizontal elongated carriage track means having a longitudinal axis disposed at substantially right angles to said axis of said pivot means; a carriage movably mounted on said track means and disposed to move thereon and in a direction parallel to said longitudinal axis; holding means on said carriage for holding a wooden or like member securely thereon; a rotary cutter assembly mounted on said frame and disposed above said carriage; said rotary cutter assembly having a rotary axis disposed at substantially right angles to said longitudinal axis of said track means; said carriage support having a movable portion spaced from said pivot means in a direction laterally relative to said horizontal axis of said pivot means; adjustable means cooperable with said frame and said carriage support, said adjustable means disposed and adapted to adjustably maintain said movable portion of said carriage support in various spaced positions relative to said frame whereby the spaced relation of said carriage relative to said cutter assembly may be adjusted.

2. The invention as defined in claim 1, wherein: actuator means is mounted on said carriage support and coupled to said carriage for moving it along said track means.

3. The invention as defined in claim 2, wherein: said holding means comprises a cylinder mounted on said carriage; said cylinder having a fluid actuated plunger; a clamp bar coupled to said plunger; a stationary bar mounted on said carriage in spaced relation to said cylinder whereby a member to be slotted by said cutter assembly may be clamped and held between said clamp bar and said stationary bar while said actuator means moves said carriage relative to said cutter assembly.

4. The invention as defined in claim 1, wherein: said holding means comprises a cylinder mounted on said carriage; said cylinder having a fluid actuated plunger; a clamp bar coupled to said plunger; a stationary bar mounted on said carriage in space relation to said cylinder whereby a member to be slotted by said cutter assembly may be clamped and held between said clamp bar and said stationary bar.

5. The invention as defined in claim 1, wherein: said rotor cutter assembly is provided with a rotary shaft, said shaft being rotatably mounted on said frame; and a plurality of generally circular cutters fixed on said shaft; said cutters having spaced apart sides and being of a width for cutting a slot of a desired width; said opposite sides of said cutters defining said width being at substantially right angles to said rotary shaft.

6. The invention as defined in claim 3, wherein: said actuator means and said cylinder of said holding means being fluid operable; a control panel having control means for actuating said plunger relative to said cylinder of said holding means; and spaced apart limit controls on said carriage and said frame for controlling operation of said actuator means to thereby limit reciprocable movements of said carriage on said track means in two directions.

7. The invention as defined in claim 6, wherein: control means on said panel is disposed for energizing said actuator means in two operative directions in relation to said limit controls.

8. The invention as defined in claim 1, wherein: said frame is provided from rotating said cutter assembly; and a control panel having means for energizing said motor.

9. The invention as defined in claim 8, wherein: said motor is a reversable motor and said last mentioned means is adapted to energize said motor in forward and reverse directions and also adapted to deenergize said motor.

10. The invention as defined in claim 6, wherein: said machine is provided with a control panel; said control panel provided with a pressure regulator control; said pressure regulator control adapted to control pressure of actuating fluid conducted to said cylinder and said actuator means.

11. The invention as defined in claim 1, wherein: said machine is provided with a control panel; and manually operable means on said control panel for controlling said actuator means.

12. The invention as defined in claim 11, wherein: said actuator means being a reversable extendable and retractable fluid operated cylinder mechanism; said cylinder mechanism mounted on said carriage support; said cylinder mechanism having a plunger coupled to said carriage.

* * * * *